(12) United States Patent
Wang

(10) Patent No.: US 12,386,420 B2
(45) Date of Patent: Aug. 12, 2025

(54) EYE TRACKING APPARATUS AND VIRTUAL REALITY APPARATUS

(71) Applicant: Beijing Zitiao Network Technology Co., Ltd., Beijing (CN)

(72) Inventor: Qiang Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/527,951

(22) Filed: Dec. 4, 2023

(65) Prior Publication Data

US 2024/0184358 A1  Jun. 6, 2024

(30) Foreign Application Priority Data

Dec. 6, 2022  (CN) .......................... 202211559255.2

(51) Int. Cl.
| | |
|---|---|
| *G09G 5/00* | (2006.01) |
| *G02B 27/00* | (2006.01) |
| *G02B 27/01* | (2006.01) |
| *G02B 27/10* | (2006.01) |
| *G02B 27/28* | (2006.01) |
| *G06F 3/01* | (2006.01) |

(52) U.S. Cl.
CPC .......... *G06F 3/013* (2013.01); *G02B 27/0093* (2013.01); *G02B 27/0101* (2013.01); *G02B 27/0172* (2013.01); *G02B 27/10* (2013.01); *G02B 27/28* (2013.01); *G02B 2027/0138* (2013.01)

(58) Field of Classification Search
CPC . G06F 3/013; G02B 27/0093; G02B 27/0101; G02B 27/0172; G02B 27/10; G02B 27/28; G02B 2027/0138
USPC ........................................................ 345/156
See application file for complete search history.

(56) References Cited

U.S. PATENT DOCUMENTS

| | | | |
|---|---|---|---|
| 10,514,544 B1* | 12/2019 | Yoon ..................... | G02B 27/017 |
| 2022/0397765 A1* | 12/2022 | Cakmakci .......... | G02B 17/0856 |
| 2023/0281835 A1* | 9/2023 | Gruhlke ............. | G02B 27/0093 |
| | | | 382/100 |
| 2023/0384584 A1* | 11/2023 | Kelly ................. | G02B 27/0081 |
| 2024/0015410 A1* | 1/2024 | Kassner .................. | G06F 3/013 |
| 2024/0171846 A1* | 5/2024 | Zhu ....................... | G02B 5/3025 |

* cited by examiner

*Primary Examiner* — Jennifer T Nguyen
(74) *Attorney, Agent, or Firm* — Alleman Hall & Tuttle LLP

(57) ABSTRACT

The disclosure provides an eye tracking apparatus and a virtual reality apparatus. The eye tracking apparatus includes a display screen, a display lens, and an eye tracking camera, the display screen and the display lens being oppositely disposed, and a displaying surface of the display screen facing the display lens; wherein the eye tracking camera is disposed adjacent to an edge of the display screen, a view-finding side of the eye tracking camera faces the display lens, an included angle between an optical axis of the eye tracking camera and an optical axis of the display lens ranges from 8.5° to 9.5°, and the eye tracking camera receives light passing through the display lens.

18 Claims, 11 Drawing Sheets

Field Curvature (unit: mm)

Distortion (unit: %)

EYE TRACKING APPARATUS AND VIRTUAL REALITY APPARATUS

CROSS-REFERENCE TO RELATED APPLICATION(S)

This application claims priority to Chinese Application No. 202211559255.2 filed Dec. 6, 2022, the disclosure of which is incorporated herein by reference in its entity.

FIELD

The disclosure relates to the wearable technology, and more particularly relates to an eye tracking apparatus and a virtual reality apparatus.

BACKGROUND

With advancements in technologies of VR (Virtual Reality) equipment, eye tracking interactions have been extended from gaze tracking to various features and scenario applications, such as IPD adjustment, foveated rendering, and virtual-real fusion alignment.

Conventional eye tracking techniques mainly employ corneal reflection, i.e., enabling eye tracking by computing movements of pupil center based on corneal reflected spots of the light emitted by multiple LEDs.

However, with decreasing miniaturization of VR glasses, image recognition accuracy of corneal reflection-based eye tracking solutions is deteriorated, which further affects eye tracking accuracy of the VR glasses.

SUMMARY

The disclosure provides an eye tracking apparatus and a virtual reality apparatus so as to solve the problem of deteriorated eye tracking accuracy caused by miniaturization of VR glasses in conventional technologies.

In one aspect, the disclosure provides an eye tracking apparatus, comprising a display screen, a display lens, and an eye tracking camera, the display screen and the display lens being oppositely disposed, and a displaying surface of the display screen facing the display lens; wherein the eye tracking camera is disposed adjacent to an edge of the display screen, a view-finding side of the eye tracking camera faces the display lens, an included angle between an optical axis of the eye tracking camera and an optical axis of the display lens ranges from 8.5° to 9.5°, and the eye tracking camera receives light passing through the display lens.

During use of the eye tracking apparatus provided according to the disclosure, eyes of a wearer are located at a side of the display lens facing away from the display screen so that the wearer may watch contents displayed on the display screen. By disposing the eye tracking camera adjacent to an edge of the display screen, i.e., the eye tracking apparatus and the display screen being both disposed at the side of the display lens facing away from the wearer's eyes, it may avoid the eye tracking camera from masking the display screen. By disposing the eye tracking camera at a side of the display lens facing away from the wearer's eyes, the included angle between the optical axis of the eye tracking camera and the gaze direction of the eyes is reduced, thusly further reducing the RSM radius of imaged spots at various parts in an observation area of the eye tracking camera and increasing spot resolving accuracy. Moreover, by setting the included angle between the optical axis of the eye tracking camera and the optical axis of the display lens to range from 8.5° to 9.5°, the eye tracking apparatus achieves a higher spot resolving accuracy, ensuring that the observation area 101 of the eye tracking camera 300 can cover movement extent of the eye 400, thereby enhancing overall performance of the eye tracking apparatus.

In addition, by disposing the eye tracking camera adjacent to an edge of the display screen, the size of the eye tracking apparatus is reduced, thereby realizing miniaturization of the eye tracking apparatus. Moreover, by disposing the eye tracking camera adjacent to an edge of the display screen, built-in of the eye tracking camera is realized, which avoids the eye tracking camera from affecting the outer appearance of the eye tracking apparatus.

In another aspect, the disclosure further provides a virtual reality apparatus. The virtual reality apparatus comprises the eye tracking apparatus described supra.

The display apparatus provided by the disclosure has same technical features as the eye tracking apparatus described supra and can achieve same technical effects, which will not be detailed here.

BRIEF DESCRIPTION OF THE DRAWINGS

The drawings provided herein are incorporated into the specification and constitute part of the specification, which illustrate embodiments in accordance with the disclosure and serve to explain the principles of the disclosure together with the specification.

Figure 1:
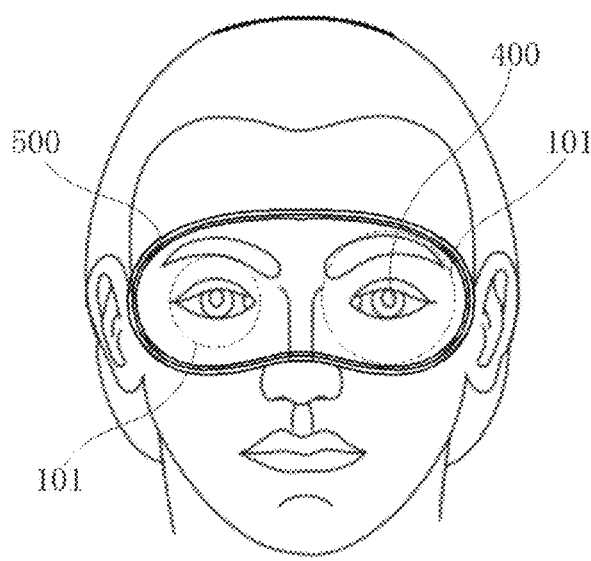
FIG. 1 is a schematic diagram of an eye tracking apparatus worn on the head in some optional embodiments of the disclosure.

Reference Numerals: 101—observation area; 100—display screen; 200—display lens; 210—visible light beam splitting film; 220—infrared light transmissive film; 230—polarizing film; 240—reflective polarizing film; 250—quarter-wave plate; 300—eye tracking camera; 400—eye; 500—housing.

Embodiments of the disclosure have been illustrated in the above figures and will be described in more detail. The figures and written description are not intended for limiting the scope of the idea of the disclosure in any manner, but for illustrating the idea of the disclosure to those skilled in the art by referring to specific example embodiments.

DETAILED DESCRIPTION OF EMBODIMENTS

Example embodiments will be described here. Examples of the embodiments are illustrated in the drawings. Identical numerals in different figures represent same or like elements throughout the description referring to the figures, unless otherwise indicated. The implementations described in the example embodiments do not represent all implementations in compliance with the disclosure. Instead, they are only examples of the apparatus and method in compliance with some aspects of the disclosure as stated in the appended claims.

In conventional corneal reflection-based VR glasses, a hot mirror is provided for disposing a camera in the glasses. Specifically, for head-mounted VR glasses, the eyes and the camera are disposed at a same side of the hot mirror, with the camera being disposed opposite outer corners of the eyes. During eye tracking, the reflected light from the corneas beams into the hot mirror and is reflected therefrom again. The light reflected from the hot mirror is illuminated into the camera again, so that the camera receives the reflected light reflected from the hot mirror and obtains positions of the eyeballs based on the camera imaging. In this way, eye tracking is implemented. To ensure spot resolving accuracy, the hot mirror needs to be disposed inclinedly relative to the eyes. However, inclined setting of the hot mirror would increase the tube length of the VR glasses, which is disadvantageous to miniaturization design of the VR glasses.

To address this problem, embodiments of the disclosure provide an eye tracking apparatus. Specifically, a display screen and an eye tracking camera in the eye tracking apparatus are disposed at the side of a display lens facing away from the eyes. The eye tracking camera and the display screen are arranged in juxtaposition, and the eye tracking camera is adjacent to an edge of the display screen, which improves compactness between the eye tracking camera and the display screen in the eye tracking apparatus and is advantageous to reduce the overall size of the eye tracking apparatus.

Furthermore, a displaying-surface side of the display screen is opposite the display lens, and a view-finding side of the eye tracking camera faces the display lens, so that the eye tracking camera may directly receive the light passing through the lens and generate an image. As such, the eye tracking apparatus according to embodiments of the disclosure is advantageous to reduce the included angle between an optical axis corresponding to the eye tracking camera and an optical axis corresponding to the display lens, further improving spot resolving accuracy. Moreover, the eye tracking apparatus provided by the disclosure eliminates a need of setting an inclined hot mirror, which avoids occupation of a relative large space by the inclined hot mirror, and is thusly advantageous to reduce the overall size of the eye tracking apparatus so as to be adapted to miniaturization design of the eye tracking apparatus, and which also solves the problem of deteriorated eye tracking accuracy accompanied with miniaturization of the eye tracking apparatus.

Hereinafter, the technical solution of the disclosure and the technical means employed by the technical solution of the disclosure in solving the technical problem will be described in detail through specific example embodiments. The specific example embodiments described infra may be combined with each other, and same or similar concepts or processes might be omitted in some example embodiments. Hereinafter, FIGS. 1 through 13 will be referenced to describe the embodiments of the disclosure.

Referring to FIGS. 4 to 7, in some optional embodiments, the eye tracking apparatus according to the disclosure comprises a display screen 100, a display lens 200 and an eye tracking camera 300, wherein the display screen 100 is configurable to display an image watched by an eye 400. The display screen 100 is disposed opposite the display lens 200, and a displaying surface of the display screen 100 faces the display lens 200. The displaying surface of the display screen 100 is a surface of the display screen 100 which displays the image watched by the eye 400.

Figure 2:
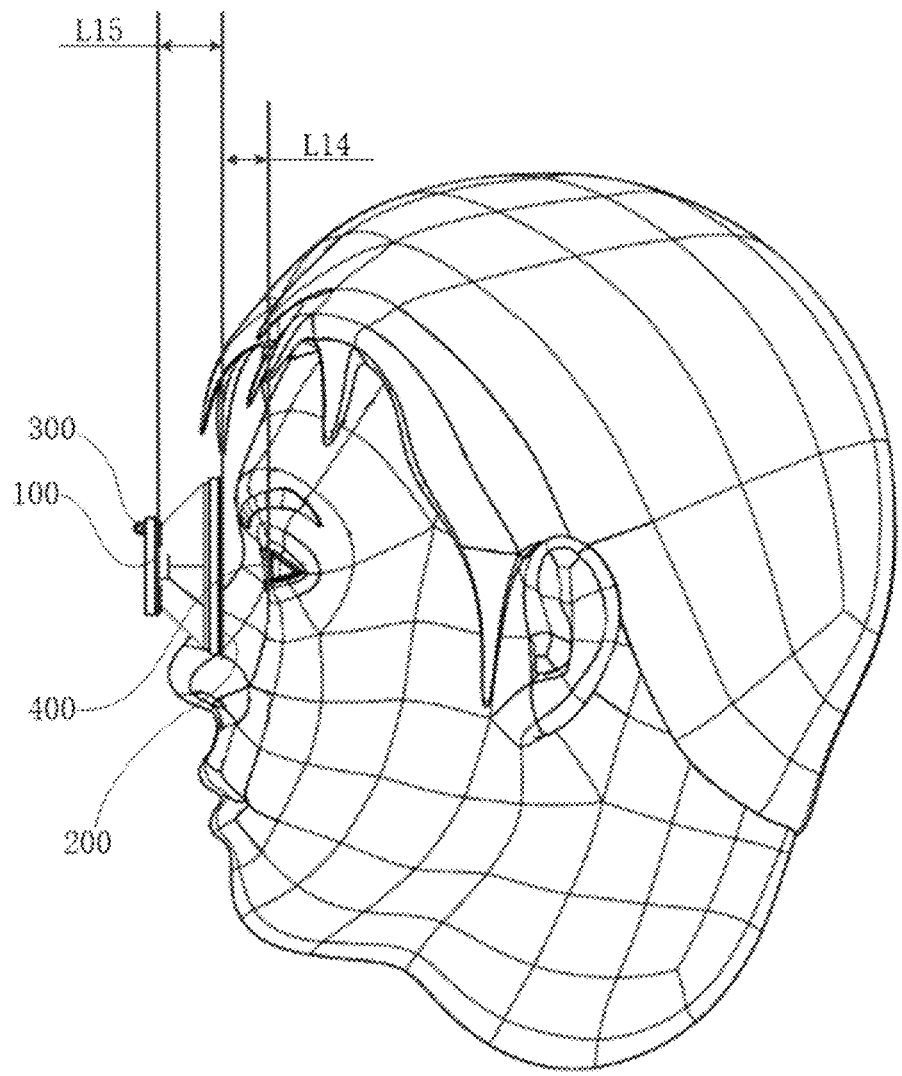
FIG. 2 is a schematic diagram of a relative position between a display screen and a display lens in some optional embodiments of the disclosure.

Optionally, as illustrated in FIG. 2, in a case that the eye tracking apparatus is worn on the head, the displaying surface of the display screen 100 faces the eye 400, and the display lens 200 is disposed between the display screen 100 and the eye 400, so that light of the display screen 100 for displaying an image may pass through the display lens 200 to beam into the eye 400, so that the eye 400 may watch the image displayed on the display screen 100. Exemplarily, the display lens 200 is configurable to amplify and project the image displayed on the display screen 100 into the eye 400.

Referring to FIGS. 4 to 7, the eye tracking camera 300 is disposed adjacent an edge of the display screen 100. A view-finding side of the eye tracking camera 300 faces the display lens 200, and the eye tracking camera 300 receives light passing through the display lens 200.

Exemplarily, the eye tracking camera 300 and the display screen 100 may be disposed in juxtaposition perpendicular to an optical axis direction of the display lens 200, and the eye tracking camera 300 is adjacent to a side wall of the display screen 100. On one hand, this solution may avoid the eye tracking camera 300 from shading the display screen 100 and reduces the distance between the eye tracking camera 300 and the display screen 100. On the other hand, this solution may also avoid increasing the size of the eye tracking apparatus in the optical axis direction of the display lens 200. Moreover, compared with conventional technologies, this solution eliminates a need of setting a hot mirror, so that the size of the eye tracking apparatus in the optical axis direction of the display lens 200 is reduced compared with setting of the hot mirror. Therefore, the eye tracking apparatus solution disclosed in this example embodiment is advantageous to miniaturization design of the eye tracking apparatus. Additionally, the eye tracking camera 300 is disposed at a side of the display lens 200 facing away from the wearer's eye 400, which is advantageous to reduce the included angle between the optical axis of the eye tracking camera 300 and the gaze of the eye, thereby improving spot resolving accuracy, bettering imaging quality of the eye tracking camera 300, and increasing eye tracking accuracy of the eye tracking apparatus. Therefore, this solution is advantageous to solve the problem of deteriorated eye tracking accuracy due to miniaturization of the eye tracking apparatus.

In some optional embodiments, the display lens may employ a Pancake solution. Specifically, the display lens 200 may realize light transmission and angle-of-view amplification within a narrow space using multiple times of back-and-forth bouncing of polarizing light, which reduces the size of the eye tracking apparatus in the gaze direction of the eye.

In some optional embodiments, the display screen 100 may be an OLED screen, which is advantageous to reduce thickness of the display screen 100 and reduce power consumption of the display screen 100.

Figure 5:
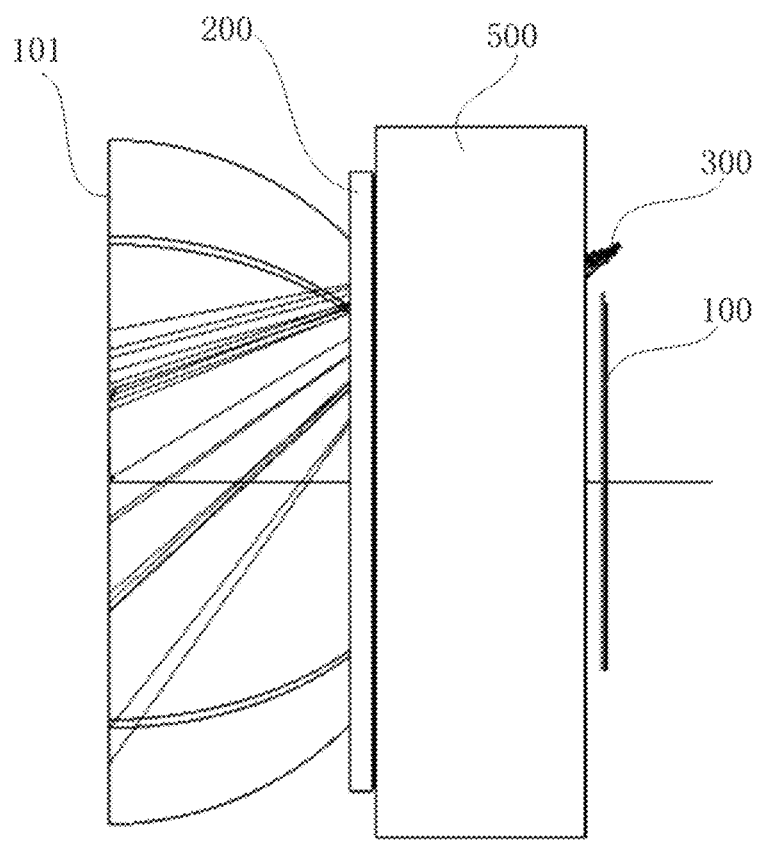
FIG. 5 is a schematic diagram of imaging of the eye tracking camera when the eye tracking apparatus is at a second angle of view in some optional embodiments of the disclosure.
Figure 6:
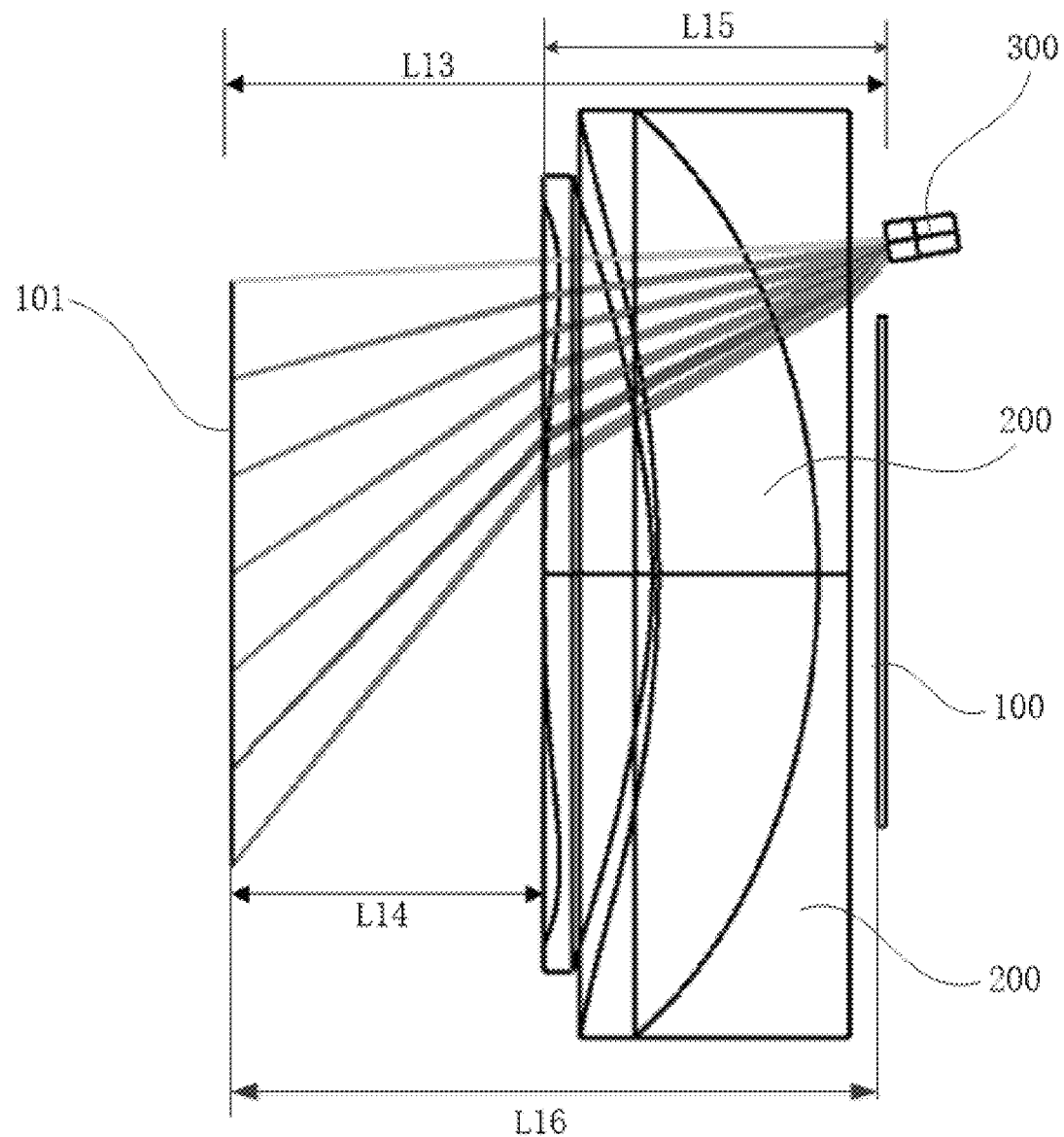
FIG. 6 is an optical path diagram of imaging of the eye tracking camera in some optional embodiments of the disclosure.
Figure 7:
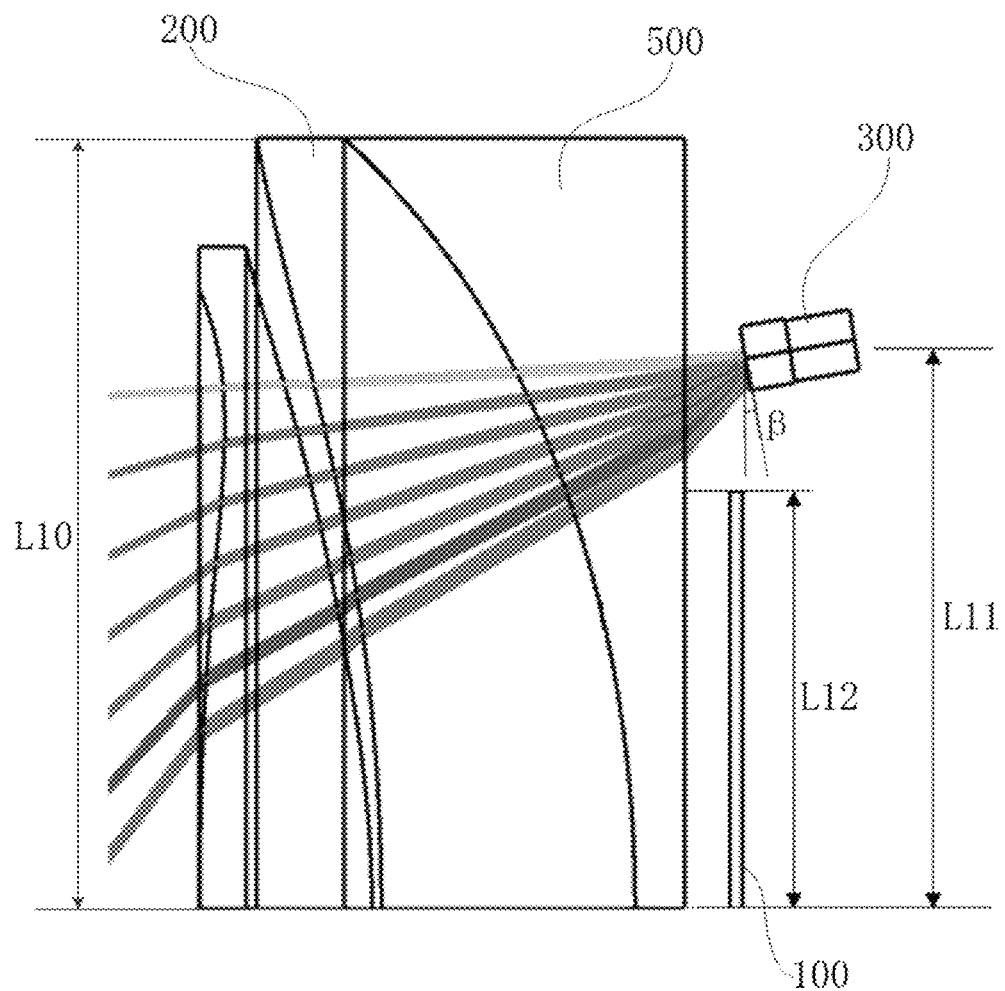
FIG. 7 is a local enlarged view of an optical path between the eye tracking camera and the display lens in FIG. 6.

Referring to FIGS. 5, 6, and 7, in some optional embodiments, the center of the display screen 100 is located on the optical axis of the display lens 200. A radial distance from the center to the edge of the display lens 200 is referred to as a first distance L10, and a vertical distance between the eye tracking camera 300 and the center of the display screen 100 is referred to as a second distance L11, the first distance L10 being greater than or equal to the second distance L11.

As an optional embodiment, the center of the display lens 200 may be the optical center of the display lens 200. Exemplarily, the optical center of the display lens 200 may coincide with the geometric center of the display lens 200. Further optionally, a cross section of the display lens 200 in the direction perpendicular to the optical axis is circular, so that the first distance L10 is the radius of the display lens 200 in the direction perpendicular to the optical axis. The center of the display screen 100 may be a symmetric center of the displaying surface of the display screen 100. Exemplarily, the displaying surface of the display screen 100 may be circular, and the center of the display screen 100 is the center of the displaying surface. Optionally, the displaying surface of the display screen 100 may be rectangular or square, and the center of the display screen 100 is the intersection of the diagonal lines of the displaying surface.

In the example embodiments above, the first distance L10 is greater than or equal to the second distance L11, so that in the eye tracking apparatus, a corresponding distance of the eye tracking camera 300 in the direction perpendicular to the optical axis of the display lens 200 is smaller than or equal to a corresponding distance of the display lens 200 in the direction perpendicular to the optical axis of the display lens 200. As such, this solution is advantageous to reduce or avoid formation of a projection at the eye tracking camera 300, further improving aesthetic appearance of the eye tracking apparatus.

In some optional embodiments, the size of the display screen 100 in the direction perpendicular to the optical axis of the display lens 200 is smaller than the size of the display lens 200 in the direction perpendicular to the display lens 200. Exemplarily, a surface of the display lens 200 facing the display screen 100 has a first area and a second area, wherein the first area refers to a projection area of the display screen 100 on the display lens 200 along the optical axis of the display lens 200, and the second area refers to a projection area of the eye tracking camera 300 on the display lens 200 along the optical axis of the display lens 200, the first area and the second area being arranged in adjacency or at an interval.

Optionally, a vertical distance between an edge of a side of the display screen 100 proximal to the eye tracking camera 300 and the center of the display screen 100 is referred to a third distance L12. The third distance L12 is smaller than the first distance L10. Further optionally, a difference between the third distance L12 and the first distance L10 in the direction perpendicular to the optical axis of the display lens 200 is greater than or equal to the distance of the eye tracking camera 300 in the direction perpendicular to the display lens 200.

In the eye tracking apparatus disclosed in the example embodiments above, the size difference between the display screen 100 and the display lens 200 in the direction perpendicular to the optical axis may provide a mounting space for the eye tracking camera 300, further avoiding the eye tracking camera 300 from increasing the size of the eye tracking apparatus in the direction perpendicular to the optical axis of the display lens 200, thusly facilitating miniaturization design of the eye tracking apparatus.

In the eye tracking apparatus disclosed in some optional embodiments of the disclosure, the first distance L10 ranges from 22 mm to 25 mm. Specifically, a too large first distance L10 would cause a too large size of the eye tracking apparatus at the display lens 200 in the direction perpendicular to the optical axis of the display lens 200, which would be disadvantages to miniaturization design of the eye tracking apparatus. A too small first distance L10 would result in a smaller mounting space for the display screen 100 and the eye tracking camera 300, which requires selecting a miniaturized display screen 100 and/or eye tracking camera 300, further increasing the costs of the display screen 100 and the eye tracking camera 300, thusly being disadvantageous to reduce the cost of the eye tracking apparatus.

Optionally, the first distance L10 may be 23.8 mm, which can avoid a too large distance of the eye tracking apparatus at the display lens 200 in the direction perpendicular to the optical axis of the display lens 200 and can also provide sufficient space for the eye tracking camera 300 and the display screen 100 so as to accommodate the distances of a conventional eye tracking camera 300 and a conventional display screen 100, thereby being advantageous to selection of the eye tracking camera 300 and the display screen 100, and reducing manufacture cost of the eye tracking apparatus.

Referring to FIG. 7, in some further optional embodiments, the vertical distance between the edge of the side of the display screen 100 proximal to the eye tracking camera 300 and the center of the display screen 100 ranges from 13 mm to 17 mm. That is, the third distance L12 ranges from 13 mm to 17 mm. Exemplarily, the display screen 100 takes on a circle shape, and the radius of the display screen 100 ranges from 13 mm to 17 mm. Further optionally, the radius of the display screen 100 is 13.08 mm.

It is noted that, the size of the display screen 100 is positively correlated to the FOV (Field of View). Specifically, when the display lens 200 is given, the larger the size of the display screen 100, the larger the FOV of the corresponding eye tracking apparatus, thusly the better the provided immersion.

In the above embodiments, on one hand, it is guaranteed that the eye tracking apparatus has a reasonable FOV with an improved immersion, and on the other hand, enough mounting space may be provided for the eye tracking camera 300.

In some optional embodiments, the size of the eye tracking camera 300 is smaller than or equal to 4 mm*4 mm*4 mm. If the size of the eye tracking camera 300 is greater than 4 mm*4 mm*4 mm, the eye tracking camera 300 would have a poor concealment. However, a smaller size of the eye tracking camera 300 would cause a higher manufacture cost of the eye tracking camera 300.

As an optional embodiment, the size of the eye tracking camera 300 is 3.5 mm*3.5 mm*3.5 mm. On one hand, this embodiment may ensure that the eye tracking camera 300 may be mounted at an edge of the adjacent display screen 100 and may also provide sufficient space for inclined setting of the eye tracking camera 300, which may further optimize the performance of the eye tracking apparatus by setting the inclined angle between the optical axis of the eye tracking camera 300 and the display lens 200. Furthermore, setting the size of the eye tracking camera 300 to 3.5 mm*3.5 mm*3.5 mm facilitates balancing between the concealment and manufacture cost of the eye tracking camera 300.

In some optional embodiments, an object distance of the eye tracking camera 300 ranges from 28 mm to 37 mm. The object distance of the eye tracking camera 300 refers to the distance from the eye tracking camera 300 to the intersection between the exit pupil plane of the eye 400 and the optical axis of the display lens 200.

Exemplarily, the object distance of the eye tracking camera 300 is referred to as a fourth distance L13 illustrated in FIG. 6. Specifically, a too large object distance of the eye tracking camera 300 would increase the size of the eye tracking apparatus in the optical axis direction of the display lens 200, which is disadvantageous to miniaturization design of the eye tracking apparatus. In addition, a too small object distance of the eye tracking camera 300 would affect mounting of the display lens 200 and would be highly demanding on the refractive performance and/or diffractive performance of the display lens 200, further increasing the manufacture cost of the display lens 200. As an optional embodiment, the object distance of the eye tracking camera 300 is 33.547 mm, which balances the miniaturization design of the eye tracking apparatus, the mounting space, and the manufacture cost of the display lens 200. Furthermore, a higher accuracy of the object distance of the eye tracking camera 300 correspondingly imposes a higher demand on the assembly accuracy of the eye tracking apparatus and the distance accuracy between respective components, further increasing the manufacture cost of the eye tracking apparatus. Further optionally, the object distance of the eye tracking camera 300 is set to 33.6 mm, so as to reduce manufacture difficulty of the eye tracking camera 300.

In an optional embodiment, the exit pupil distance of the display lens 200 ranges from 13 mm to 20 mm. The exit pupil distance refers to the distance from the vertex of a surface of the display lens 200 facing away from the display screen 100 to the intersection between the exit pupil plane of the eye 400 and the optical axis of the display lens 200. Exemplarily, the exit pupil distance of the display lens 200 is referred to as a fifth distance L14 illustrated in FIG. 6.

It is noted that, the smaller the exit pupil distance of the display lens 200, the more easily the display lens 200 touches the eyelashes at the eye 400, affecting wearing comfort of the eye tracking apparatus. Generally, the length of the eyelashes of the eye 400 is less than 12 mm. To this end, in the embodiments described supra, the exit pupil distance of the display lens 200 ranges from 13 mm to 20 mm, which can effectively avoid the eyelashes at the eye 400 from contacting the display lens 200, further avoiding the display lens 200 from touching the eyelashes at the eye 400, thereby enhancing wearing comfort of the eye tracking apparatus. However, with increase of the exit pupil distance of the display lens 200, the space in the eye tracking apparatus for mounting the display lens 200, the display screen 100, and/or the eye tracking camera 300 gradually decreases. In the case that the space occupied by the display lens 200, the display screen 100, and the eye tracking camera 300 is given, the larger the exit pupil distance of the display lens, the larger the size of the eye tracking apparatus in the optical axis of the display lens 200. Therefore, a too large exit pupil distance of the display lens is disadvantageous to miniaturization design of the overall size of the eye tracking apparatus.

In some optional embodiments, the exit pupil distance of the display lens 200 is 16 mm. This embodiment facilitates reduction of the size of the eye tracking apparatus in the optical axis direction of the display lens 200, which may also ensure that for a majority of people, when they are wearing the eye tracking apparatus, the display lens 200 will not touch their eyelashes at the eye 400, thereby improving wearing comfort of the eye tracking apparatus.

Further optionally, as illustrated in FIG. 6, a distance from the displaying surface of the display screen 100 to the intersection between the exit pupil plane of the eye 400 and the optical axis of the display lens 200 in the optical axis direction of the display lens 200 is referred to as a seventh distance L16. Exemplarily, the seventh distance L16 ranges from 30 mm to 37 mm. Exemplarily, the seventh distance L16 is 33.5 mm.

In some optional embodiments, the field of view of the eye tracking camera 300 ranges from 70° to 85°. Specifically, a larger field of view of the eye tracking camera 300 is advantageous to increase the size of the imaging area corresponding to the eye tracking camera 300. However, with increase of the field of view, the resolution accuracy corresponding to the eye tracking camera 300 decreases gradually. Of course, to enhance the resolution accuracy corresponding to the eye tracking camera 300, the field of view of the eye tracking camera 300 may be reduced. However, a too small field of view of the eye tracking camera 300 would have a consequence that the observation area 101 of the eye tracking camera 300 cannot cover the movement extent of the eye 400, so that eye movement in some areas cannot be tracked.

The embodiments described supra may determine the size of the observation area 101 based on the field of view of the eye tracking camera 300, the position of the eye tracking camera 300, the size of the display lens 200, and an air spacing parameter between the eye tracking camera 300 and the display lens 200. Specifically, the embodiments advantageously set a radius of the observation area 101 to range from 20 mm to 30 mm.

It is noted that, during a watching process, the eye 400 would move within a certain extent. The observation area 101 refers to an imaging area of the eye tracking camera 300. Specifically, to achieve eye tracking, the imaging area of the camera needs to cover the moving extent of the eye 400.

Optionally, the observation area 101 is a circular area. Generally, a 20 mm radius of the observation area 101 suffices to cover the movement extent of the eyes of most population.

Therefore, the observation area 101 of the eye tracking camera 300 in the eye tracking apparatus disclosed in the embodiments above may cover the movement extent of the eyes of most population, which facilitates the eye tracking apparatus to be adapted to eye tracking for different populations. Moreover, in a case that the observation area 101 of the eye tracking camera 300 cannot cover the movement extent of the eye 400, the field of view of the eye tracking camera 300 may be reduced in favor to achieve a balance between the extent of the observation area 101 of the eye tracking camera 300 and the resolution accuracy of the eye tracking camera 300.

In some further optional embodiments, the field of view of the eye tracking camera 300 is 71°, so that the radius of the observation area 101 corresponding to the eye tracking camera 300 may be greater than or equal to 20 mm.

In further optional embodiments, the field of view of the eye tracking camera 300 is 74°, so as to avoid assembly error of the eye tracking camera 300 with respect to the display lens 200 and/or other components causing the observation area 101 unable to cover the movement extent of the eye 400. In further optional embodiments, the field of view of the eye tracking camera 300 ranges from 81° to 84° to reserve an anti-shading angle.

By considering the assembly accuracy between the eye tracking camera 300 and other components with an anti-shading angle reserved, the embodiments described supra ensure that the observation area 101 may cover the movement extent of the eye 400, further improving yield of the eye tracking apparatus.

Further optionally, the field of view of the eye tracking camera 300 may be further optimized based on the position of the eye tracking camera 300, the size of the display lens 200, and the air spacing parameter between the eye tracking camera 300 and the display lens 200, so as to improve eye tracking accuracy.

Figure 3:
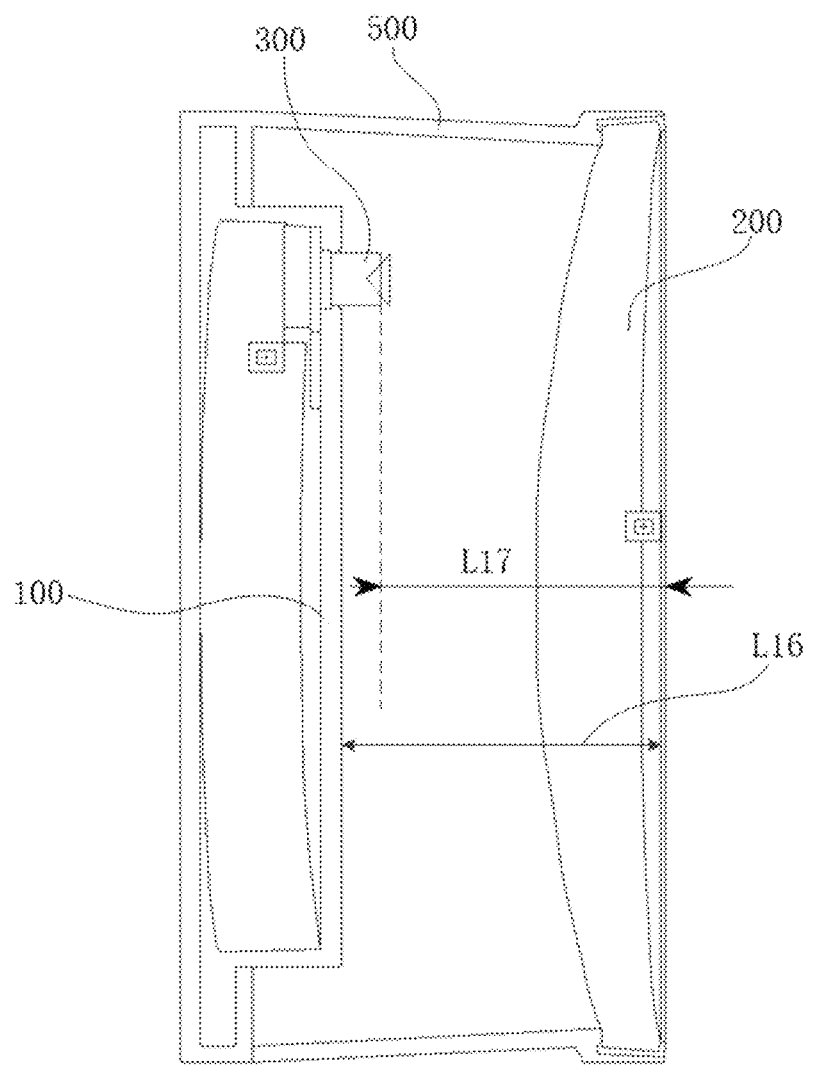
FIG. 3 is a sectional view of the eye tracking apparatus in some optional embodiments of the disclosure.
Figure 4:
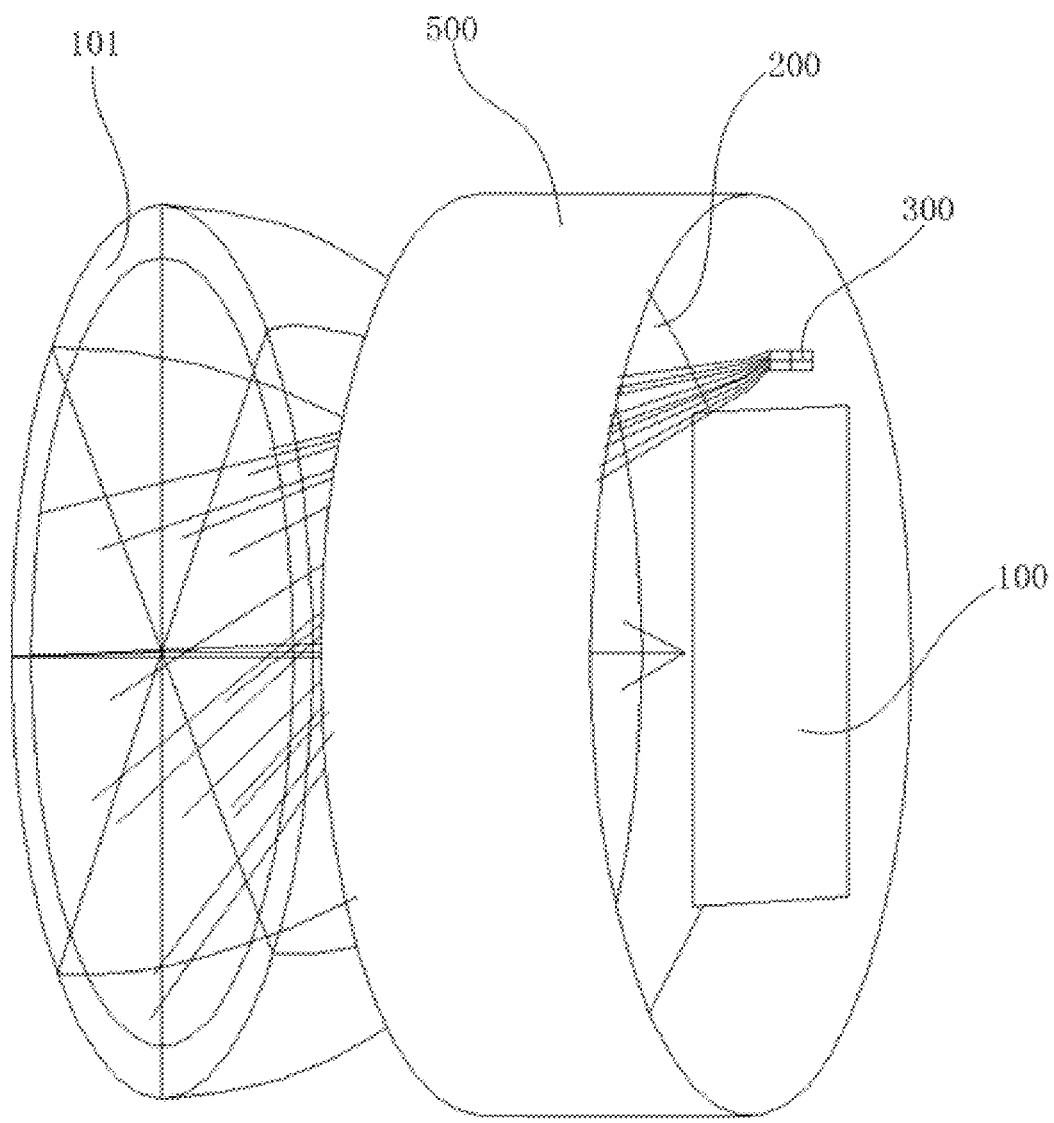
FIG. 4 is a schematic diagram of imaging of the eye tracking camera when the eye tracking apparatus is at a first angle of view in some optional embodiments of the disclosure.

Referring to FIG. 3, in some optional embodiments, a distance between the eye tracking camera 300 and a surface of the display lens 200 facing away from the eye tracking camera 300 ranges from 15 mm to 18 mm. In a case that the surface of the display lens 200 facing away from the eye tracking camera 300 is a convex surface, the distance between the eye tracking camera 300 and the surface of the display lens 200 facing away from the eye tracking camera 300 is the distance between the eye tracking camera 300 and the vertex of the surface of the display lens 200 facing away from the eye tracking camera 300 in the optical axis direction of the display lens 200.

Referring to FIG. 6, in some further optional embodiments, a distance between the eye tracking camera 300 and the vertex of the surface of the display lens 200 facing away from the display screen 100 in the optical axis direction of the display lens 200 is referred to as a sixth distance L15.

Exemplarily, the sixth distance L15 ranges from 15 mm to 18 mm. Exemplarily, the sixth distance L15 is 16.547 mm.

In the eye tracking apparatus disclosed by some optional embodiments, a resolution of an image produced by the eye tracking camera 300 is 400*400. Specifically, although a too high image resolution produced by the eye tracking camera 300 may enhance imaging definiteness of the eye tracking camera 300, it would increase processing difficulty of the image produced by the eye tracking camera 300 and increase power consumed for processing the image produced by the eye tracking camera 300. Specifically, although a too low imaging resolution produced by the eye tracking camera 300 may reduce processing difficulty of the image produced by the eye tracking camera 300 and power consumed by the eye tracking apparatus, it would cause insufficient definiteness of the image produced by the eye tracking camera 300, further affecting eye tracking accuracy.

In the above embodiments, a resolution of the image produced by the eye tracking camera 300 is 400*400, which achieves a balance between the definiteness of the image produced by the eye tracking camera 300 and the processing difficulty of the image produced by the eye tracking camera 300, so that power consumption of the eye tracking apparatus is reduced while ensuring the eye tracking accuracy.

In some optional embodiments, an included angle between the optical axis of the eye tracking camera 300 and the optical axis of the display lens 200 ranges from 8.5° to 9.5°, ensuring that the eye tracking camera 300 images clearly and completely. Preferably, the included angle between the optical axis of the eye tracking camera 300 and the optical axis of the display lens 200 is 9.2°. In some optional embodiments, as illustrated in FIG. 7, an included angle between a plane perpendicular to the optical axis of the eye tracking camera 300 and a plane perpendicular to the optical axis of the display lens 200 is denoted as β. The included angle between the optical axis of the eye tracking camera 300 and the optical axis of the display lens 200 is equal to the angle β. Optionally, the angle β is 9.2°.

It is noted that, a too large included angle between the optical axis of the eye tracking camera 300 and the optical axis of the display lens 200 would lead to a larger RMS (Root Mean Square) radius of the imaging spots at various parts in the observation area 101 of the eye tracking camera 300, further reducing spot resolving accuracy. However, a too small included angle between the optical axis of the eye tracking camera 300 and the optical axis of the display lens 200 would easily result in the observation area 101 of the eye tracking camera 300 failing to cover the entire movement extent of the eye, further causing failure to track movement of the eye 400 in some areas. The eye tracking apparatus disclosed in the embodiments described supra may shrink the included angle between the optical axis of the eye tracking camera 300 and the optical axis of the display lens 200 while ensuring that the observation area 101 of the eye tracking camera 300 covers the movement extent of the eye 400, further enhancing overall performance of the eye tracking apparatus.

FIG. 9A through FIG. 12 illustrate simulation results of the eye tracking apparatus disclosed in some optional embodiments of the disclosure, wherein the diameter of the observation area 101 of the eye tracking camera 300 is 30 mm, the exit pupil distance of the display lens 200 is 16 mm, the object distance of the eye tracking camera 300 is 33.6 mm, and the included angle between the optical axis of the eye tracking camera 300 and the optical axis of the display lens 200 is 9.2°.

Figure 9A:
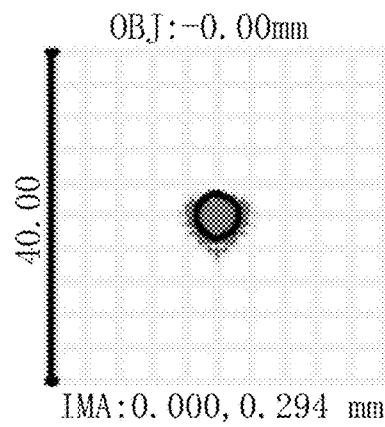
FIG. 9A is a spot diagram of a first field of the eye tracking camera in some optional embodiments of the disclosure.
Figure 9B:
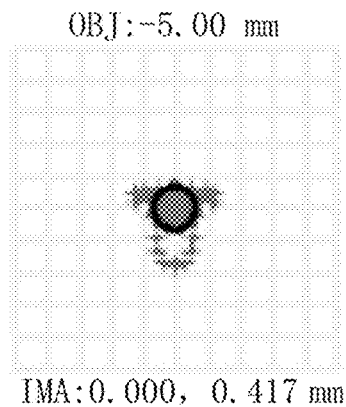
FIG. 9B is a spot diagram of a second field of the eye tracking camera in some optional embodiments of the disclosure.
Figure 9C:
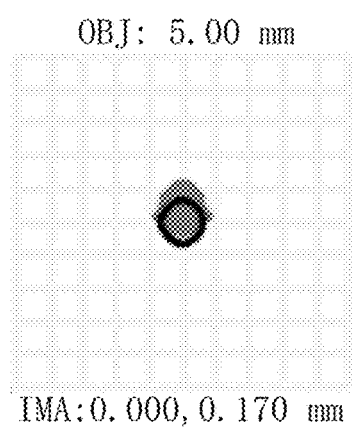
FIG. 9C is a spot diagram of a third field of the eye tracking camera in some optional embodiments of the disclosure.
Figure 9D:
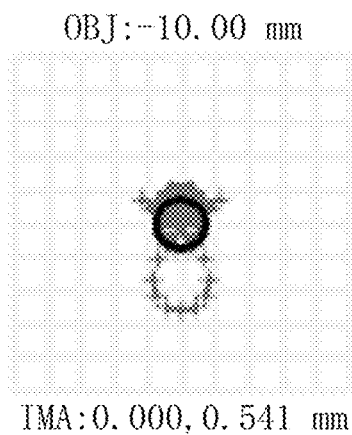
FIG. 9D is a spot diagram of a fourth field of the eye tracking camera in some optional embodiments of the disclosure.
Figure 9E:
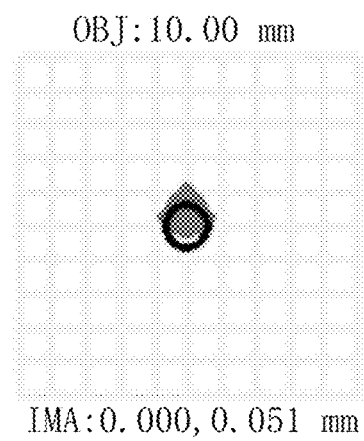
FIG. 9E is a spot diagram of a fifth field of the eye tracking camera in some optional embodiments of the disclosure.
Figure 9F:
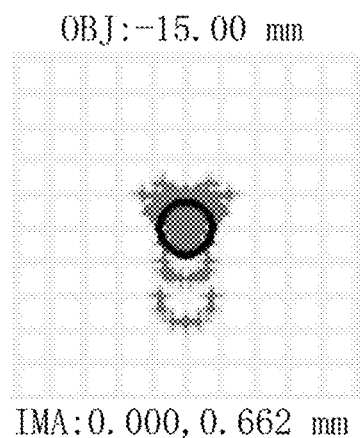
FIG. 9F is a spot diagram of a sixth field of the eye tracking camera in some optional embodiments of the disclosure.
Figure 9G:
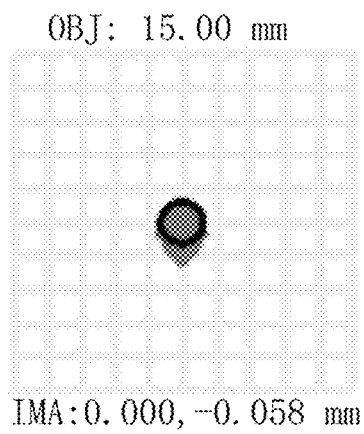
FIG. 9G is a spot diagram of a seventh field of the eye tracking camera in some optional embodiments of the disclosure.

FIG. 9A through FIG. 9G are spot diagrams corresponding to the eye tracking camera 300 in the eye tracking apparatus. As illustrated in FIG. 9A through FIG. 9G, this simulation selects 7 fields to analyze. As illustrated in FIG. 9A, the object plane (OBJ) corresponding to the first field is 0.00 mm, and the image plane is 0.000, 0.294 mm. As illustrated in FIG. 9B, the object plane (OBJ) corresponding to the second field is −5.00 mm, and the image plane is 0.000, 0.417 mm. As illustrated in FIG. 9C, the object plane (OBJ) corresponding to the third field is 5.00 mm, and the image plane is 0.000, 0.170 mm. As illustrated in FIG. 9D, the object plane (OBJ) corresponding to the fourth field is −10.00 mm, and the image plane is 0.000, 0.541 mm. As illustrated in FIG. 9E, the object plane (OBJ) corresponding to the fifth field is 10.00 mm, and the image plane is 0.000, 0.051 mm. As illustrated in FIG. 9F, the object plane (OBJ) corresponding to the sixth field is −15.00 mm, and the image plane is 0.000, 0.662 mm. As illustrated in FIG. 9G, the object plane (OBJ) corresponding to the seventh field is 15.00 mm, and the image plane is 0.000, −0.058 mm. Specifically, the RMS (Root mean square) radius and GEO radius corresponding to respective fields are set forth in the table below:

TABLE 1

Correspondence Table of RMS Radius and GEO Radius Corresponding to Respective Fields in FIG. 9A through FIG. 9G Spot Diagrams
Unit: μm Airy Radius: 2.587 μm. the legends correspond to wavelengths

| Field | 1 | 2 | 3 | 4 | 5 | 6 | 7 |
|---|---|---|---|---|---|---|---|
| RMS Radius: | 1.724 | 2.376 | 2.209 | 3.647 | 2.129 | 4.204 | 1.951 |
| GEO Radius: | 4.283 | 7.110 | 3.760 | 10.444 | 3.759 | 11.250 | 3.901 |

Zoom Bar: 40
Reference: Chief Ray

In Table 1, the GEO radius refers to the maximum radius. It may be seen from FIG. 9 and Table 1 that, the RMS radii of the imaging spots corresponding to the fields other than the fourth field and the sixth field are all smaller than the diffractive extreme radius 2.544. Therefore, the eye tracking camera 300 in the eye tracking apparatus described in the embodiments supra has a higher imaging resolving power.

Figure 10:
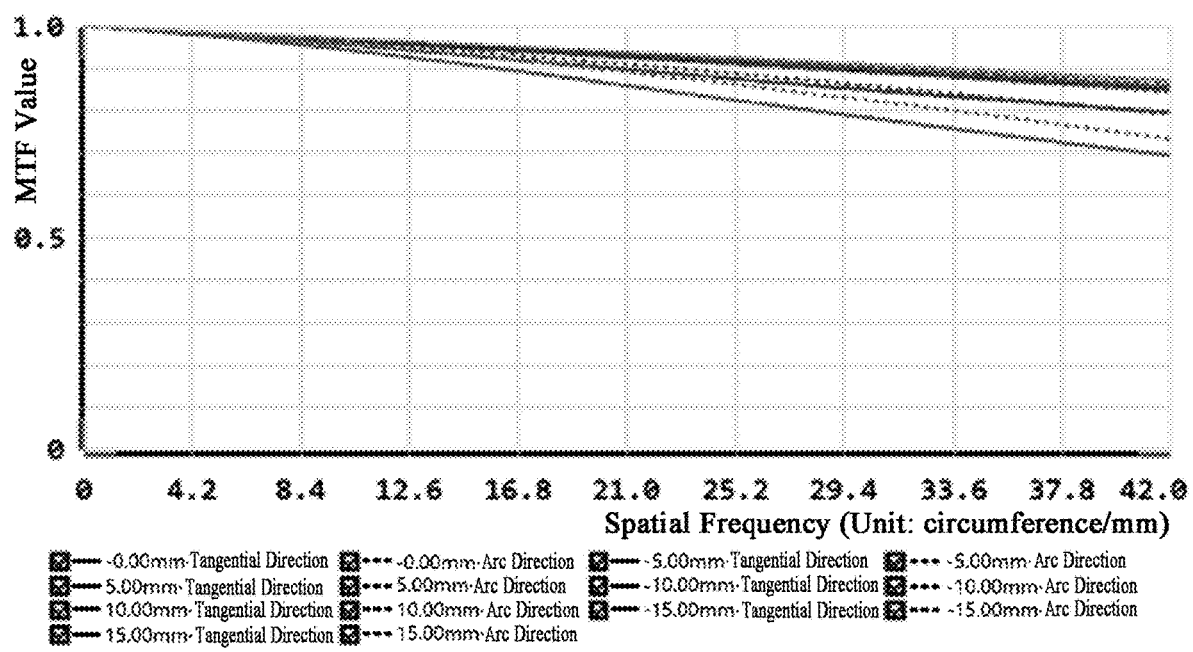
FIG. 10 is a schematic diagram of a modulation transfer function corresponding to imaging of the eye tracking camera in some optional embodiments of the disclosure

FIG. 10 illustrates an MTF (Modulation Transfer Function) image corresponding to imaging of the eye tracking camera 300. Specifically, the longitudinal axis represents the MTF value, and the horizontal axis represents the spatial frequency. Referring to FIG. 10, at the 42 lp/mm Nyquist frequency, the resolving power of the eye tracking camera 300 with respect to the object in the observation area 101 is MTF>0.7. It is noted that the MTF value ranges from 0 to 1, which may reflect an image definiteness. Specifically, the closer to 1 the MTF value is, the more powerful a camera's capability to restore the reality, i.e., the clearer the image is. For a sensor with a 400*400 resolution, MTF>0.5 generally indicates a system with a good imaging quality. Therefore, in the embodiments described supra, the eye tracking camera 300 has a good imaging quality, further ensuring eye tracking accuracy.

Figure 11A:
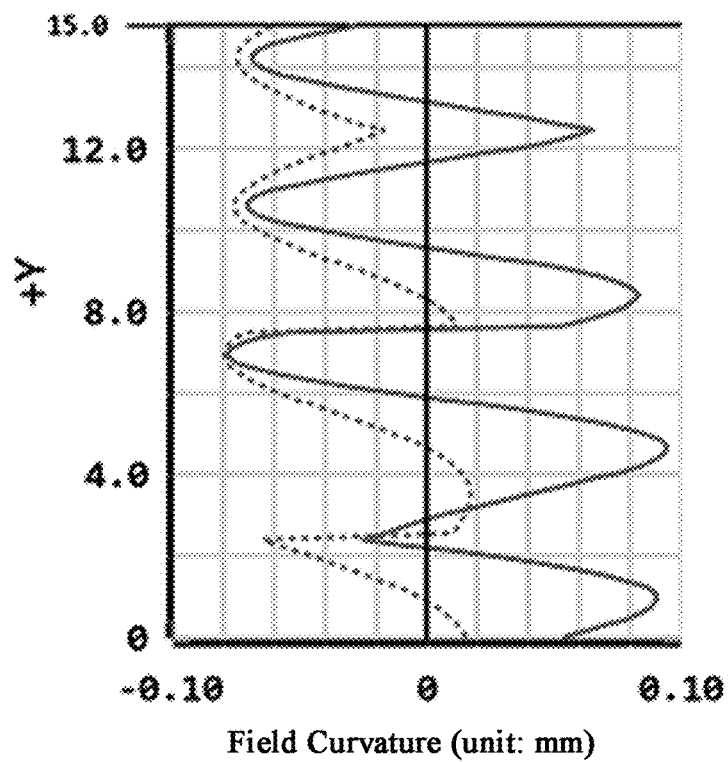
FIG. 11A is a field curvature analysis diagram corresponding to imaging of the eye tracking apparatus in some optional embodiments of the disclosure.
Figure 11B:
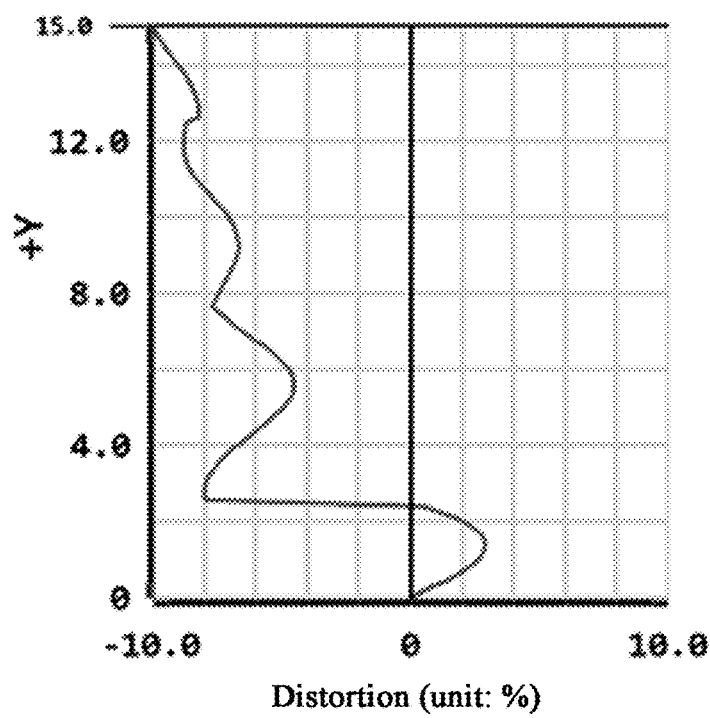
FIG. 11B is a distortion analysis diagram corresponding to imaging of the eye tracking apparatus in some optional embodiments of the disclosure.
Figure 12:
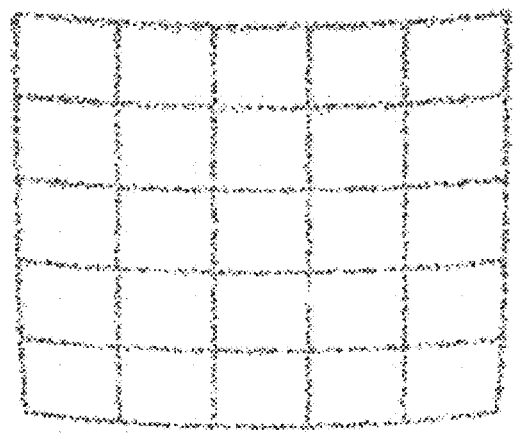
FIG. 12 is a grid distortion analysis diagram corresponding to imaging of the eye tracking camera in some optional embodiments of the disclosure.

FIG. 11A is a field curvature analysis diagram corresponding to imaging of the eye tracking camera 300 of the eye tracking apparatus in some optional embodiments of the disclosure. FIG. 11B is a distortion analysis diagram corresponding to imaging of the eye tracking camera in some optional embodiments of the disclosure. Specifically, it may be seen from FIG. 11A through FIG. 12 that, in the embodiments above, the imaging of the observation area 101 of the eye tracking apparatus on the eye tracking camera 300 has a distortion of about 13%. In some optional embodiments, the distortion of the imaging of the observation area 101 on the eye tracking camera 300 may be corrected by, but not limited to, the CORDIC (Coordinate Rotation Digital Computer) algorithm.

Figure 8:
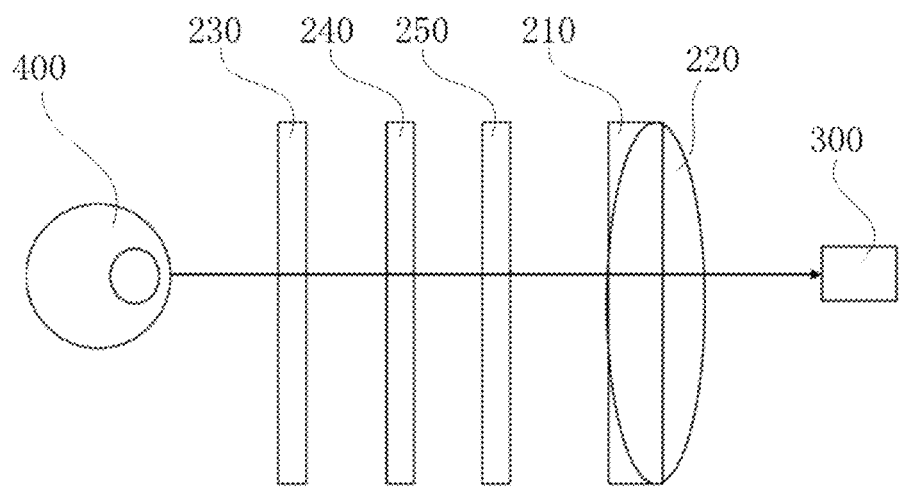
FIG. 8 is a structural schematic diagram of the display lens in some optional embodiments of the disclosure.

In the eye tracking apparatus disclosed in some optional embodiments, as illustrated in FIG. 8, the display lens 200 further comprises a visible light beam splitting film 210 and an infrared light transmissive film 220. The visible light beam splitting film 210 and the infrared light transmissive film 220 are both disposed at a side of the display lens 200 proximal to the eye tracking camera 300, and the infrared light transmissive film 220 is stacked at a side of the visible light beam splitting film 210 proximal to the eye tracking camera 300. Exemplarily, the infrared light transmissive film 220 may be an AR (Anti-Reflectance) film. Furthermore, the visible light beam splitting film 210 and the infrared light transmissive film 220 are composite films of the visible light beam splitting film 210 and the infrared light transmissive film 220.

Figure 13:
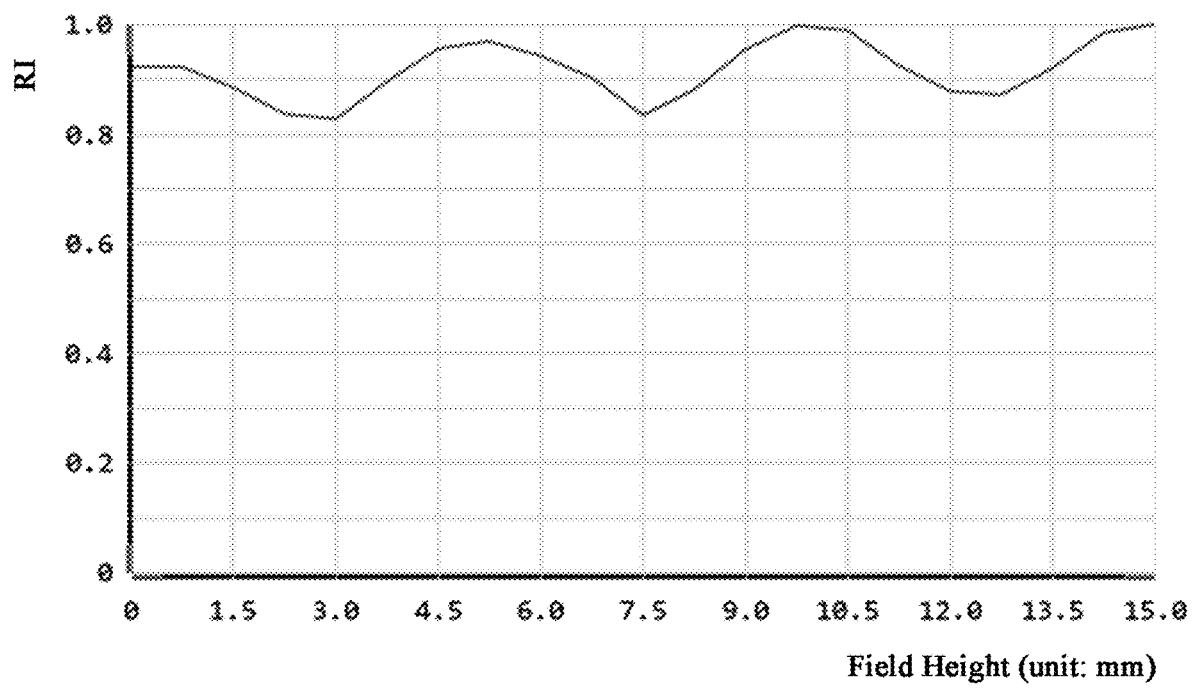
FIG. 13 is a schematic diagram of a field relative illumination corresponding to eye tracking camera imaging in some optional embodiments of the disclosure.

In the eye tracking apparatus described in the above embodiments, the visible light beam splitting film 210 and the infrared light transmissive membrane 220 may increase the luminance entering the eye tracking camera 300 to 40% above. FIG. 13 is a schematic diagram of a field relative illumination corresponding to imaging of the eye tracking camera 300 in some optional embodiments of the disclosure. In conjunction with FIG. 13, it may be directly derived that the relative illumination (RI) value on an image produced by the eye tracking camera 300: RI>80%. Therefore, the embodiments described supra are advantageous to prevent occurrence of serious black blocks to imaging of the eye tracking camera 300.

In the eye tracking apparatus disclosed in some optional embodiments of the disclosure, the display lens 200 further comprises a polarizing film 230, a reflective polarizing film 240, and a quarter-wave plate 250, the reflective polarizing film 240 and the quarter-wave plate 250 being stacked at a side of the polarizing film 230 proximal to the eye tracking camera 300, the reflective polarizing film 240 being disposed between the quarter-wave plate 250 and the polarizing film 230, the visible light beam splitting film 210 and the infrared light transmissive film 220 being disposed at a side of the quarter-wave plate 250 proximal to the eye tracking camera 300. In some optional embodiments, the display lens 200 may comprise a plurality of stacked lenses. Optionally, the polarizing film 230, the reflective transmissive film 240, and the quarter-wave plate 250 may be disposed on different lenses.

In some embodiments of the disclosure, light emitted from the display screen 100 partially passes through the visible light beam splitting film 210 and the infrared light transmissive film 220 to beam into the display lens 200. Moreover, the light entering the display lens 200 is a polarized light. The light entering the display lens 200 passes through the lens in the display lens 200, and is reflected by the reflective polarizing film 240. The reflected light from the reflective polarizing film 240 passes through the quarter-wave plate 250 where phase delay is realized and the phase changes by 90°, and is then reflected by the visible light beam splitting film 210 and the infrared light transmissive film 220 to enter the lens in the display lens 200. Then, the reflected light from the visible light beam splitting film 210 and the infrared light transmissive film 220 passes again through the lens in the display lens 200, the quarter-wave plate 250, and the reflective polarizing film 240 and exits from a side of the display lens 200 away from the display screen 100. In this way, the optical path of the visible light emitted from the display screen 100 is pancaked at the display lens 200.

In the eye tracking apparatus disclosed in some optional embodiments, the eye tracking apparatus further comprises an infrared device, and a light exit side of the infrared device faces the eye 400, so that the infrared light emitted by the infrared device is reflected by the eye 400 and passes through the display lens 200 to beam into the eye tracking camera 300. Exemplarily, the infrared device may be an infrared LED lamp.

In some embodiments provided by the disclosure, the infrared light emitted from the infrared device, after being reflected from the eye 400, may directly pass through the display lens 200 to beam into the eye tracking camera 300. That is, the infrared light will not be repeatedly pancaked to extend the optical path when passing through the display lens 200. Moreover, the infrared light transmissive film 220 is advantageous for the infrared light to pass through, further increasing brightness of the light entering the eye tracking camera 300.

In this embodiment, the eye tracking camera 300 performs imaging based on the infrared light reflected from the eye 400. During movement of the eye 400, the position of the pupil of the eye 400 imaged by the eye tracking camera 300 changes. Exemplarily, the eye tracking apparatus may be a headset. Specifically, when the eye tracking apparatus is worn on the head, the eye tracking camera 300 and the infrared LED lamp do not move relative to the head, so that the corneal reflection position is relatively fixed. During movement of the eye 400, the pupil center moves relative to the corneal reflection position. As such, a gaze/fixation position of the eye 400 may be determined by the eye tracking camera 300 tracking positional changes of the pupil center of the eye 400.

In some optional embodiments, the eye tracking apparatus further comprises a housing 500. The housing 500 is a basic structural member, which may provide a mounting base for the display screen 100, the display lens 200, and/or the eye tracking camera 300. Further optionally, the display screen 100, the display lens 200, and/or the eye tracking camera 300 may all be directly and/or indirectly disposed in the housing 500. Further optionally, the display screen 100, the display lens 200, and/or the eye tracking camera 300 may all be directly or indirectly fixed in the housing 500 to ensure a fixed relative position between the display screen 100, the display lens 200, and the eye tracking camera 300, thereby ensuring eye tracking accuracy of the eye tracking apparatus. Further optionally, the housing 500 may be a headset housing to facilitate a user to wear the eye tracking apparatus.

In another aspect, the disclosure further provides a virtual reality apparatus. The virtual reality apparatus comprises the eye tracking apparatus described supra.

The virtual reality apparatus provided by the disclosure has same technical features as the eye tracking apparatus and can achieve same technical effects, which will not be detailed here.

Optionally, the virtual reality apparatus described herein may be VR glasses. Further optionally, the virtual reality apparatus has a headset housing to facilitate a user to wear the virtual reality apparatus.

After considering the specification and implementing the present disclosure, those skilled in the art would readily contemplate other embodiments of the disclosure. The present disclosure intends to cover any alteration, use or adaptation to the disclosure, and such alterations, uses or adaptations follow the general principle of the disclosure and encompass the common knowledge or customary means in the art not disclosed herein. The specification and the embodiments are only deemed as exemplary; the substantive scope and spirit of the disclosure is stated in the appending claims.

It should be understood that the disclosure is not limited to those accurate structures having been described supra and illustrated in the accompanying drawings and may be subjected to various modifications and changes without departing from its scope. The scope of the disclosure is only limited by the appending claims.

The invention claimed is:

1. An eye tracking apparatus, characterized by comprising: a display screen, a display lens, and an eye tracking camera, the display screen and the display lens being oppositely disposed, and a displaying surface of the display screen facing the display lens;
   wherein the eye tracking camera is disposed adjacent to an edge of the display screen, a view-finding side of the eye tracking camera faces the display lens, an included angle between an optical axis of the eye tracking camera and an optical axis of the display lens ranges from 8.5° to 9.5°, and the eye tracking camera receives light passing through the display lens,
   wherein the display lens further comprises a polarizing film, a reflective polarizing film and a quarter-wave plate, wherein the reflective polarizing film and the quarter-wave plate are stacked at a side of the polarizing film proximal to the eye tracking camera, the reflective polarizing film is disposed between the quarter-wave plate and the polarizing film.

2. The eye tracking apparatus according to claim 1, characterized in that a center of the display screen is disposed at the optical axis of the display lens, wherein a radial distance from a center to an edge of the display lens is referred to as a first distance, a vertical distance between the eye tracking camera and the center of the display screen is referred to as a second distance, and the first distance is greater than or equal to the second distance.

3. The eye tracking apparatus according to claim 2, characterized in that the eye tracking apparatus meets at least one of the following:
   the first distance ranges from 22 mm to 25 mm, and
   a vertical distance from an edge of a side of the display screen proximal to the eye tracking camera to the center of the display screen ranges from 13 mm to 17 mm.

4. The eye tracking apparatus according to claim 1, characterized in that the eye tracking apparatus meets at least one of the following:
   an object distance of the eye tracking camera ranges from 28 mm to 37 mm, and
   a field of view of the eye tracking camera ranges from 70° to 85°.

5. The eye tracking apparatus according to claim 4, characterized in that a distance between the eye tracking camera and a side of the display lens facing away from the eye tracking camera ranges from 15 mm to 18 mm.

6. The eye tracking apparatus according to claim 1, characterized in that a resolution of an image produced by the eye tracking camera is 400*400.

7. The eye tracking apparatus according to claim 1, characterized in that the display lens further comprises a visible light beam splitting film and an infrared light transmissive film, wherein the visible light beam splitting film and the infrared light transmissive film are both disposed at a side of the display lens proximal to the eye tracking camera, and the infrared light transmissive film is stacked at a side of the visible light beam splitting film proximal to the eye tracking camera.

8. The eye tracking apparatus according to claim 7, characterized in that the visible light beam splitting film and the infrared light transmissive film are disposed at a side proximal to the eye tracking camera.

9. The eye tracking apparatus according to claim 1, characterized by further comprising an infrared device, wherein a light exit side of the infrared device faces an eye, and an infrared light emitted from the infrared device is reflected by the eye to pass through the display lens and beam into the eye tracking camera.

10. A virtual reality apparatus, characterized by comprising an eye tracking apparatus, wherein the eye tracking apparatus comprises: a display screen, a display lens, and an eye tracking camera, the display screen and the display lens being oppositely disposed, and a displaying surface of the display screen facing the display lens;
  wherein the eye tracking camera is disposed adjacent to an edge of the display screen, a view-finding side of the eye tracking camera faces the display lens, an included angle between an optical axis of the eye tracking camera and an optical axis of the display lens ranges from 8.5° to 9.5°, and the eye tracking camera receives light passing through the display lens,
  wherein the display lens further comprises a polarizing film, a reflective polarizing film and a quarter-wave plate, wherein the reflective polarizing film and the quarter-wave plate are stacked at a side of the polarizing film proximal to the eye tracking camera, the reflective polarizing film is disposed between the quarter-wave plate and the polarizing film.

11. The virtual reality apparatus according to claim 10, characterized in that a center of the display screen is disposed at the optical axis of the display lens, wherein a radial distance from a center to an edge of the display lens is referred to as a first distance, a vertical distance between the eye tracking camera and the center of the display screen is referred to as a second distance, and the first distance is greater than or equal to the second distance.

12. The virtual reality apparatus according to claim 11, characterized in that the eye tracking apparatus meets at least one of the following:
  the first distance ranges from 22 mm to 25 mm, and
  a vertical distance from an edge of a side of the display screen proximal to the eye tracking camera to the center of the display screen ranges from 13 mm to 17 mm.

13. The virtual reality apparatus according to claim 10, characterized in that the eye tracking apparatus meets at least one of the following:
  an object distance of the eye tracking camera ranges from 28 mm to 37 mm, and
  a field of view of the eye tracking camera ranges from 70° to 85°.

14. The virtual reality apparatus according to claim 13, characterized in that a distance between the eye tracking camera and a side of the display lens facing away from the eye tracking camera ranges from 15 mm to 18 mm.

15. The virtual reality apparatus according to claim 10, characterized in that a resolution of an image produced by the eye tracking camera is 400*400.

16. The virtual reality apparatus according to claim 10, characterized in that the display lens further comprises a visible light beam splitting film and an infrared light transmissive film, wherein the visible light beam splitting film and the infrared light transmissive film are both disposed at a side of the display lens proximal to the eye tracking camera, and the infrared light transmissive film is stacked at a side of the visible light beam splitting film proximal to the eye tracking camera.

17. The virtual reality apparatus according to claim 16, characterized in that visible light beam splitting film and the infrared light transmissive film are disposed at a side proximal to the eye tracking camera.

18. The virtual reality apparatus according to claim 10, characterized by further comprising an infrared device, wherein a light exit side of the infrared device faces an eye, and an infrared light emitted from the infrared device is reflected by the eye to pass through the display lens and beam into the eye tracking camera.

* * * * *